(12) United States Patent
Iman et al.

(10) Patent No.: US 8,926,220 B2
(45) Date of Patent: Jan. 6, 2015

(54) PROCESS FOR THICKENING A DRILLING MUD WASTE MATERIALS AND A MODIFIED DRILLING MUD WASTE MATERIAL

(75) Inventors: Craig D. Iman, Cranberry Township, PA (US); James T. George, State College, PA (US); James S. Herceg, Shickshinny, PA (US); Craig W. Vaughan, Cranberry Township, PA (US); Todd W. Groff, Beaver, PA (US)

(73) Assignee: Henwil Corporation, Beaver, PA (US)

( * ) Notice: Subject to any disclaimer, the term of this patent is extended or adjusted under 35 U.S.C. 154(b) by 178 days.

(21) Appl. No.: 13/470,746

(22) Filed: May 14, 2012

(65) Prior Publication Data

US 2012/0294679 A1    Nov. 22, 2012

Related U.S. Application Data

(60) Provisional application No. 61/486,456, filed on May 16, 2011.

(51) Int. Cl.
*B09B 1/00*    (2006.01)
*B09B 3/00*    (2006.01)
*C02F 11/14*    (2006.01)

(52) U.S. Cl.
CPC .............. *B09B 3/0033* (2013.01); *C02F 11/14* (2013.01)
USPC ..................................................... 405/129.3

(58) Field of Classification Search
USPC ..................................................... 405/129.3
See application file for complete search history.

(56) References Cited

U.S. PATENT DOCUMENTS

| | | | |
|---|---|---|---|
| 4,063,386 A | 12/1977 | Tramier | |
| 4,172,066 A | 10/1979 | Zweigle et al. | |
| 4,353,803 A | 10/1982 | Dover, Jr. | |
| 4,666,983 A | 5/1987 | Tsubakimoto et al. | |
| 4,913,585 A * | 4/1990 | Thompson et al. | 405/129.25 |
| 5,213,446 A * | 5/1993 | Dovan | 405/129.3 |
| 5,258,123 A * | 11/1993 | Huang et al. | 210/663 |
| 7,252,783 B2 | 8/2007 | Weir et al. | |
| 2009/0093665 A1 | 4/2009 | Ross et al. | |

OTHER PUBLICATIONS

The International Search Report and the Written Opinion of PCT/US2012/37755; filed May 14, 2012.

* cited by examiner

*Primary Examiner* — John Kreck
(74) *Attorney, Agent, or Firm* — Buchanan Ingersoll & Rooney PC; Craig G. Cochenour

(57) ABSTRACT

The present invention provides a process for thickening drilling mud waste materials including the steps of mixing a drilling mud waste materials having greater than zero percent by weight free liquid with an effective amount of one or more anionic copolymers to form a treated drilling mud waste materials. The anionic copolymer is derived from either (a) an anionic monomer, a nonionic monomer, and a cross-linking monomer, resulting in a cross-linked anionic copolymer; or (b) a non-cross-linked, linear chain co-polymer of an anionic polymer and a nonionic polymer; or (c) a blend of the combination of (a) and (b). A modified drilling mud waste material is disclosed having zero percent by weight free liquid.

23 Claims, 2 Drawing Sheets

PAINT FILTER TEST APPARATUS

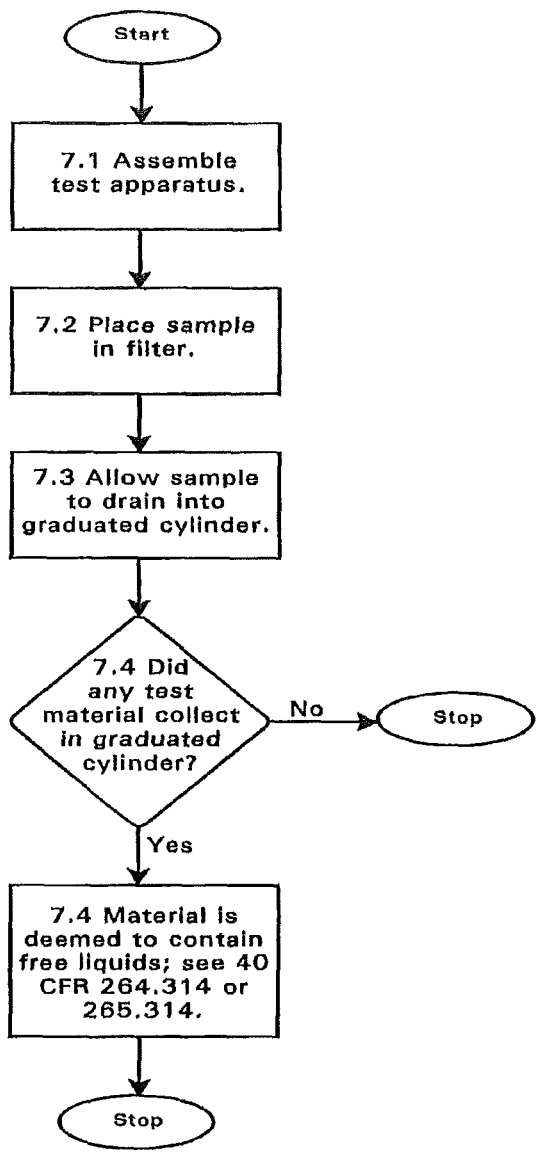

PROCESS FOR THICKENING A DRILLING MUD WASTE MATERIALS AND A MODIFIED DRILLING MUD WASTE MATERIAL

BENEFIT OF PRIOR PATENT APPLICATION

This utility patent application claims the benefit of co-pending prior U.S. Provisional Patent Application Ser. No. 61/486,456, filed on May 16, 2011 entitled "Process For Thickening A Drilling Mud Waste Materials And A Modified Drilling Mud Waste Material" having the same named applicants as inventors. The entire contents of U.S. Provisional Patent Application Ser. No. 61/486,456 is incorporated by reference herein.

BACKGROUND OF THE INVENTION

1. Field of the Invention

The present invention relates to a process for thickening a drilling mud waste materials whereby the drilling mud waste materials may be optionally safely transported and disposed to another area, such as for example but not limited to a landfill. In particular, this invention provides such a process wherein the aqueous drilling mud waste materials (effluent from the drilling process) is thickened by mixing it with an effective amount of an anionic copolymer to form a treated drilling mud waste materials. The treated drilling mud waste materials are then optionally transported for disposal to another location, such as a landfill.

2. Background Art

In the oil and gas industries, drilling processes produce waste streams that are associated with oil and gas operations. Drill site construction and rigging produce debris as well as drilling activities which include for example but are not limited to operation of the rig, and use of a drilling mud system, drill cuttings, spent and used solvents, paint and paint wastes, pipe doping materials, sand and scale, paraffin, and hydraulic fluids, all of which may contaminate soil. Drilling fluid (i.e. "drilling mud") is used to maintain hydrostatic pressure for well control, carry drill cuttings to the surface, and cool and lubricate the drilling bit. These drilling muds may be fresh water based, salt water based, oil based, or synthetic. These waste materials and waste streams are frequently diverted to a drilling mud waste pit that must be contained and further processed so that the wastes may be properly disposed of. The treatment of the drilling mud waste pit is time consuming and costly. Current environmental regulations require that waste materials for disposal into landfills must pass a paint filter liquid test, as described herein. The paint filter liquid test when performed on a representative sample of the waste materials is determinative of whether the subject waste material is deemed to be free of any free liquids and therefore acceptable for disposal in a landfill.

U.S. Pat. No. 4,063,386 teaches a method for restoring of drilling mud pits comprising the covering of the floc in a mud pit with a dry material capable of absorbing water from the floc and covering the material with earth. U.S. Pat. No. 4,063,386 discloses that the absorbent material is a natural cellulosic material that is saw dust, wood chips, peat, cork, straw, corncobs, leaves, or paper waste materials. U.S. Pat. No. 4,063,386 also discloses that the absorbent material may be chips of foam of polyurethane, polystyrene, polyethylene, or polypropylene. U.S. Pat. No. 4,063,386 teaches that the quantity of absorbent material used is such that it can absorb all of the water from the floc of the mud pit.

U.S. Pat. No. 4,353,803 teaches a flocculant useful for waste drilling fluid reserve pit treating wherein the reserve pit contains an aqueous spent oil-well drilling mud including an anionic colloid selected from the group consisting of drilling-fluid grade lignosulfonate and alkaline-soluble lignite, the flocculant consisting essentially of from 24 to 49 parts by weight of aluminum sulfate per part by weight of polyacrylamide homo-polymer having from 130 to 500 pendant amide groups per pendant carboxylic-acid or carboxylic-acid-salt group and having a molecular weight in the range of from 10,000 to 5 million. U.S. Pat. No. 4,353,803 teaches a process of separating into good quality water and high density solids, an admixture of waste drill cuttings, drilling fluid and by-products of rotary drilling, which process comprises combining the aluminum sulfate and polyacrylamide homo-polymer flocculant with the admixture, flocculating solids in the admixture and separating water from the flocculated solids within a few days.

U.S. Pat. No. 4,913,585 teaches treating a waste drilling mud by flocculating, aggregating, agglomerating and dewatering the waste drilling mud and separating out free water. The process disclosed in U.S. Pat. No. 4,913,585 stabilizes the waste drilling mud for earthern burial. U.S. Pat. No. 4,913,585 discloses that the thickened, dewatered drilling mud solids may be further treated with a water absorbing binder to produce a residue which has sufficient bearing strength to support an earthen overburden and may be disposed of by burial. U.S. Pat. No. 4,913,585 discloses that the water absorbing binder may be natural gums (e.g., carboxymethylcellulose, guar, hydroxyethylcellulose, carrageenan, alginates, and low to moderate molecular weight polyacrylamide polymers). U.S. Pat. No. 4,913,585 teaches the addition of a gallon of polyacrylamide emulsion to a barrel of separated sludge having a solids content of approximately 20-35% by volume. The combined sludge and polyacrylamide emulsion are mixed, and bagged and sealed in plastic bags for transport to a landfill. U.S. Pat. No. 4,913,585 further teaches that a separated drilling mud waste sludge may be further treated by applying a water permeable layer such as sand, for example, four inches in thickness over the top of the separated waste sludge, and that a polyacrylamide absorbent binder layer of approximately one-sixth of an inch thickness is placed above the sand layer, and that about four feet of an earth overburdern may be placed on top of the polyacrylamide absorbent binder layer. U.S. Pat. No. 4,913,585 states that the overlying earthen overburden, water absorbent poly-acrylamide layer, and sand compress the sludge so that a portion of the remaining moisture content is squeezed out of the sludge and percolates up through the sand layer and into the water absorbent binder layer (acrylamide layer). U.S. Pat. No. 4,913,585 states that the water absorbent binder (acrylamide layer) remains separated from the waste drilling mud solids. It is believed that under the current environmental landfill regulations, waste sludge treated according to the teachings of U.S. Pat. No. 4,913,585 would fail the paint filter liquids test.

It is known to add fly ash as a thickener to aqueous drilling mud waste materials. However, doing so has the disadvantage of requiring addition of 2 parts fly ash to every 1 part drilling mud waste. It is known to add sawdust as a thickener to drilling mud waste materials. However, doing so has the disadvantage of requiring 3 parts sawdust to every 1 part of drilling mud waste materials. One-half of the weight of the resulting treated solid is sawdust. It is know by those skilled in the art to add wood chips as a thickener to drilling mud waste materials but the wood chips require even a higher ratio of woods chips to drilling mud waste materials compared to sawdust addition since the wood chips have a lower absorptive capacity than sawdust. Thus, wood chips as a thickener possess even a greater disadvantage than use of sawdust. Quick lime is known to be used as a thickener added to drilling mud waste materials but such addition requires greater than 4 parts quick lime to 1 part drilling mud waste materials and such addition has the further disadvantage of generating heat that can be hazardous. It is known to use the sodium salt of polyacrylic acid to thicken drilling mud waste materials however the absorptive capacity of the sodium salt of polyacrylic acid is one-third that of the potassium salt of the cross-linked copolymer and is not economical.

Up to now, the known absorbing processes and dewatering processes utilized in drilling mud waste pit restoration have been time consuming and expensive. The treated mud waste pit must pass a paint filter liquids test that is used by landfills to determine acceptability of the treated drilling wastes prior to its disposal. The present applicants have developed such a process that advantageously provides for the thickening of the aqueous and non-aqueous fluids of a drilling mud waste materials such that the treated waste may be transported from the drilling site to a landfill within several hours of treatment.

The present applicants have found unexpected results with the process of the instant invention in that the present applicants are able to (1) thicken the drilling mud pit waste materials such that the liquid content of the treated waste is tied up so as to pass the landfill disposal tests, (2) apply the superabsorbent anionic copolymer of the instant process with the use of mechanical means, (3) achieve a reaction and solidification time from an hour to less than twelve hours of treating the drilling mud waste materials; and (4) to effect a minimal change in the overall volume of the pre-treated drilling mud waste materials compared to the volume of the treated drilling mud waste materials. Thus, the applicants process provides the added economic benefits of thickening the drilling mud waste materials while not substantially increasing the volume of treated waste that requires transportation to a landfill compared to the use of known combinations of additives that reduce the liquid water content of the waste but increase the volume of the treated waste for transportation by several fold. Thus, applicants process fulfills a long-felt but heretofore unmet need in the oil and gas industry for processing drilling mud waste materials and for restoring the land where the drilling mud waste pit is physically located.

SUMMARY OF THE INVENTION

The present invention provides a process for thickening an aqueous drilling mud waste materials comprising mixing an aqueous drilling mud waste materials having from greater than zero percent free liquid to about ninety-nine percent free liquid with an effective amount of at least one anionic copolymer to form a treated drilling mud waste materials, and providing an effective amount of time period sufficient for the treated drilling mud waste materials to thicken for eliminating the free liquid present in the untreated aqueous drilling mud waste materials, and optionally transporting said thickened treated drilling mud waste materials to a landfill for disposal. The optional step of transporting the thickened treated drilling mud waste materials to a land fill will result in restoring the land where the untreated drilling mud waste materials were physically located.

In a preferred embodiment of the present invention as described herein, the process includes wherein the effective amount of the anionic copolymer is from about four (4) pounds to about seventy (70) pounds by dry weight per one long wet ton of the aqueous drilling mud waste materials, and more preferably from about four pounds to about thirty (30) pounds by dry weight per one long wet ton of the aqueous drilling mud waste.

The process, as described herein, includes wherein the anionic copolymer is derived from the copolymerization of an anionic monomer and a nonionic monomer, and a cross-linking monomer. Preferably, the process is as described herein, including wherein the anionic monomer is selected from the group consisting of acrylic acid, sodium acrylate, and potassium acrylate, and combinations thereof, and wherein the nonionic monomer is selected from the group consisting of acrylamide, and methacrylamide, and combinations thereof, and wherein the cross-linking monomer (or agent) is selected from the group consisting of N,N'-methylenebisacrylamide, N-(1-hydroxy-2,2-dimethyloxyethyl) acrylamide, a diamine, and a silicate, and combinations thereof.

In a preferred embodiment of the present invention, the process, as described herein, includes wherein the effective amount of the cross-linking monomer (or cross-linking agent) is from about one (1) parts-per-million to one-hundred (100) parts-per-million by dry weight basis based upon a combined dry weight of said anionic monomer and said nonionic monomer.

In a more preferred embodiment of the present invention, the process, as described herein, including wherein the anionic copolymer is derived from an anionic monomer that is acrylic acid and a nonionic monomer that is acrylamide.

In another embodiment of the present invention, a process for thickening an aqueous drilling mud waste materials is provided, comprising mixing an aqueous drilling mud waste materials having from greater than zero percent free liquid to one hundred percent free liquid with an effective amount of at least one anionic homo-polymer and an effective amount of at least one nonionic homo-polymer and an effective amount of at least one cross-linking agent to form a cross-linked anionic copolymer in said aqueous drilling mud waste materials in-situ for treating the drilling mud waste materials, and providing an effective amount of time period sufficient for the treated drilling mud waste materials to thicken for eliminating the free liquid in the untreated drilling mud waste materials, and optionally transporting the thickened treated drilling mud waste materials to a landfill for disposal. In this process, one embodiment including simultaneously mixing the anionic homo-polymer and the nonionic homo-polymer and the cross-linking agent (or cross-linking monomer) into the aqueous drilling mud waste materials, is provided. In yet another embodiment of this process, the process including sequentially mixing the anionic homo-polymer, the nonionic homo-polymer, and the cross-linking agent into the untreated aqueous drilling mud waste materials to form a treated drilling mud waste materials is provided. In another embodiment of this process, the process including sequentially mixing the nonionic homo-polymer, the anionic homo-polymer, and the cross-linking agent into the aqueous drilling mud waste materials to form a treated drilling mud waste materials is provided.

A modified drilling mud waste material is provided comprising an aqueous drilling mud waste material having zero percent free liquid and one or more anionic copolymers. The modified drilling mud waste material includes wherein the anionic copolymer is derived from the copolymerization of an anionic monomer, a nonionic monomer, and a cross-linking monomer.

In another embodiment, the modified drilling mud waste material comprises wherein the anionic monomer is selected from the group consisting of acrylic acid, sodium acrylate, and potassium acrylate, and combinations thereof, wherein the nonionic monomer is selected from the group consisting of acrylamide, and methacrylamide, and combinations thereof, and wherein the cross-linking monomer is selected from the group consisting of N,N'-methylenebisacrylamide, N-(1-hydroxy-2,2-dimethyloxyethyl)acrylamide, a diamine, and a silicate, and combinations thereof.

A modified drilling mud waste material is provided comprising a drilling mud waste material having zero percent free liquid and one or more anionic copolymers. Preferably, the anionic copolymer of the modified drilling mud waste material is either (a) a cross-linked anionic co-polymer derived from a copolymerization of an anionic monomer and a nonionic monomer, and a cross-linking monomer, or (b) a non-cross-linked, linear chain co-polymer of an anionic polymer and a nonionic polymer, or (c) a blend of the combination of (a) and (b). The drilling mud waste material may be a water-based drilling mud waste material, or a oil-based drilling mud waste material, or a combination of an oil-based drilling mud waste material and a water-based drilling mud waste material.

Another embodiment provides a process for thickening an oil-based drilling mud waste materials comprising mixing an oil-based drilling mud waste materials having from greater than zero percent by weight free liquid to ninety nine percent by weight free liquid with an effective amount of at least one anionic copolymer to form a treated oil-based drilling mud waste materials, wherein the anionic copolymer is derived from either (a) a copolymerization of an anionic monomer and a nonionic monomer, and a cross-linking monomer, or (b) a non-cross-linked, linear chain co-polymer of an anionic polymer and a nonionic polymer, or (c) a blend of the combination of (a) and (b); and providing an effective amount of time period sufficient for the treated oil-based drilling mud waste materials to thicken for eliminating the free liquid, and optionally transporting the thickened treated oil-based drilling mud waste materials to a landfill for disposal.

Another embodiment of the present invention provides a process for thickening a drilling mud waste materials comprising mixing a drilling mud waste materials having from greater than zero percent by weight free liquid to ninety nine percent by weight free liquid with an effective amount of at least one anionic copolymer to form a treated drilling mud waste materials, wherein the anionic copolymer is derived from either (a) a copolymerization of an anionic monomer and a nonionic monomer, and a cross-linking monomer, resulting in a cross-linked anionic copolymer; or (b) a non-cross-linked, linear chain co-polymer of an anionic polymer and a nonionic polymer; or (c) a blend of the combination of (a) and (b); and. providing an effective amount of time period sufficient for the treated drilling mud waste materials to thicken for eliminating the free liquid, and optionally transporting the thickened treated drilling mud waste materials to a landfill for disposal. The drilling mud waste materials may be oil-based drilling mud waste materials or a water-based drilling mud waste materials. In a preferred embodiment of this invention, the process, as described herein, includes wherein the anionic co-polymer of the non-cross-linked, linear chain co-polymer is 50% by weight of acrylic acid (anionic polymer) and 50% by weight of acrylamide (nonionic polymer).

Another embodiment of the present invention provides a process for thickening an aqueous drilling mud waste materials comprising mixing an aqueous drilling mud waste materials having from greater than zero percent by weight free liquid to ninety nine percent by weight free liquid with an effective amount of (i) at least one cross-linked anionic copolymer, as described herein, and (ii) a linear anionic copolymer, as described herein, to form a treated drilling mud waste materials; and providing an effective amount of time period sufficient for the treated drilling mud waste materials to thicken for eliminating the free liquid, and optionally transporting the thickened treated drilling mud waste materials to a landfill for disposal. Preferably, this process includes wherein the cross-linked anionic copolymer and the linear anionic copolymer are added to the aqueous drilling mud waste as a blend. More preferably, this process includes wherein the cross-linked anionic copolymer and the linear anionic copolymer are added to the aqueous drilling mud sequentially in any order of addition or simultaneously.

A further embodiment of this invention provides a process for thickening an aqueous drilling mud waste materials comprising mixing an aqueous drilling mud waste materials having from greater than zero percent by weight free liquid to ninety nine percent by weight free liquid with an effective amount of (i) at least one nonionic homo-polymer, as described herein, (ii) at least one linear anionic copolymer, as described herein, and (iii) a cross-linking monomer, as described herein, to form a treated drilling mud waste materials; and providing an effective amount of time period sufficient for the treated drilling mud waste materials to thicken for eliminating the free liquid, and optionally transporting the thickened treated drilling mud waste materials to a landfill for disposal. Preferably, this process includes wherein the nonionic homo-polymer, the linear anionic copolymer, and the cross-linking monomer are added to the aqueous drilling mud waste as a blend. More preferably, this process includes wherein the nonionic homo-polymer, the linear anionic copolymer, and the cross-linking monomer are added to the aqueous drilling mud sequentially in any order of addition or simultaneously.

Another embodiment of the present invention provides a process for thickening an aqueous drilling mud waste materials comprising mixing an aqueous drilling mud waste materials having from greater than zero percent by weight free liquid to ninety nine percent by weight free liquid with an effective amount of (i) at least one cross-linked anionic copolymer, as described herein, and (ii) a cross-linking monomer, as described herein, to form a treated drilling mud waste materials; and providing an effective amount of time period sufficient for the treated drilling mud waste materials to thicken for eliminating the free liquid, and optionally transporting the thickened treated drilling mud waste materials to a landfill for disposal. Preferably, this process includes wherein the cross-linked anionic copolymer and the cross-linking monomer are added to the aqueous drilling mud waste as a blend. More preferably, this process includes wherein the cross-linked anionic copolymer and the cross-linking monomer are added to the aqueous drilling mud sequentially in any order of addition or simultaneously.

BRIEF DESCRIPTION OF THE DRAWING

FIG. 2 shows the paint filter liquid test method 9095B decision tree used by landfill operators to determine if a representative sample of waste is deemed to be free of any free liquids. Only those sample wastes that are deemed to be devoid of free liquids may be disposed in a landfill.

DETAILED DESCRIPTION OF THE INVENTION

Figure 1:
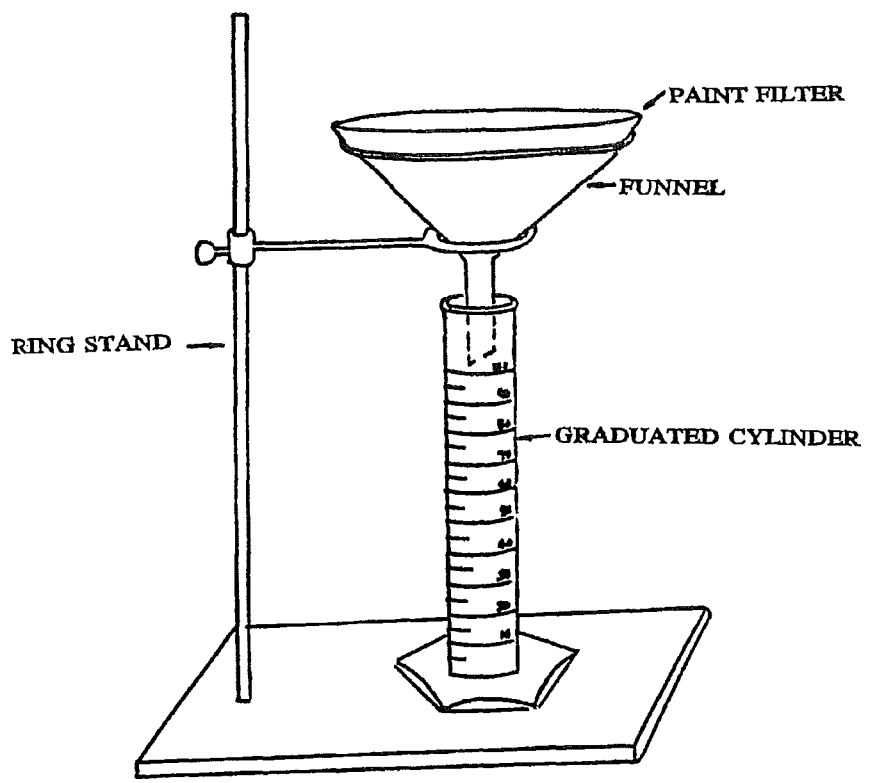
FIG. 1 shows the paint filter test apparatus used by landfill operations to determine the presence of free liquids in a representative sample of waste.

The instant invention is directed to (a) a process for thickening an aqueous drilling mud waste materials and eliminating any free water associated therewith, and (b) a modified drilling mud waste material that is substantially devoid ("substantially free") of any free water associated therewith.

As used herein, "effective amount" refers to that amount of the composition necessary to bring about a desired result, such as for example, the amount needed to effect the elimination of all of the free water associated with the pretreated aqueous drilling mud waste materials that have from greater than zero weight percent (0 wgt. %) to up to about ninety-nine weight percent (99.0 wgt. %) free water content. In other words, the effective amount is the amount of the anionic copolymer of the present process that is able to tie-up all of the free water associated with the untreated drilling mud waste materials thereby forming a treated drilling mud waste materials. The treated drilling mud waste materials are able to pass the paint filter liquids test as described herein and as shown in FIGS. 1 and 2.

As used herein, "substantially devoid of free water" refers to the state of a treated aqueous drilling mud waste material that has all of its free water content tied up within the matrix of the drilling mud waste material. The treated aqueous drilling mud waste material has been subjected to the process of the present invention wherein an untreated aqueous drilling mud waste material has been mixed with an anionic copolymer of the present invention, or wherein the anionic copolymer matrix is formed in-situ in the drilling mud waste materials. The term "substantially devoid of free water" indicates that that the copolymer treated aqueous drilling mud waste materials have sequestered the free water content of the pretreated aqueous drilling mud waste materials so that the copolymer treated aqueous drilling mud waste materials may pass the "Paint Filter Liquids Test Method 9095B" used to determine compliance with United States Code of Federal Regulations, 40 CFR 264.314 and 265.314. The Paint Filter Liquids Test Method 9095B is used by landfills as a criteria for testing suspect liquid containing waste (or refuse) before the waste is accepted to be placed into the landfill. Thus, for example, an aqueous drilling mud waste material that is substantially devoid of free water is one in which the initial free water content before treatment is absorbed by an anionic copolymer to the extent required in order for the post treated (modified) drilling mud waste materials to pass the Paint Filter Liquids Test Method 9095B.

As used herein, the terms "copolymer" and "co-polymer" and "heteropolymer" have identical meanings and such terms are used interchangeably herein, and are defined as a polymer derived from two or more monomeric species, as opposed to the term "homopolymer" where only one monomer is used. The term "copolymerization" refers to methods used to chemically synthesize a copolymer. The term "linear copolymer" means a copolymer in which the molecules form long chains without cross-linked structures. The molecular chains of a linear copolymer may be intertwined, but the forces tending to hold the molecules together are physical rather than chemical.

The present invention provides a process for thickening an aqueous drilling mud waste materials comprising mixing an aqueous drilling mud waste materials having from greater than zero weight percent free liquid to ninety-nine weight percent free liquid with an effective amount of at least one anionic copolymer to form a treated drilling mud waste materials, and providing an effective amount of time period sufficient for the treated drilling mud waste materials to thicken for eliminating the free liquid present in the untreated aqueous drilling mud waste materials, and optionally transporting said thickened treated drilling mud waste materials to a landfill for disposal. The optional step of transporting the thickened treated drilling mud waste materials to a land fill will result in restoring the land where the untreated drilling mud waste materials were physically located. An effective amount of time period for thickening to occur ranges from, for example and not limited to, about one (1) minute to forty eight (48) hours, or longer.

In a preferred embodiment of the present invention as described herein, the process includes wherein the effective amount of the anionic copolymer is from about four (4) pounds to about seventy (70) pounds (Lb) by dry weight per one long ton (1 T) of said aqueous drilling mud waste materials. As used herein, the term "long ton" (1 T) refers to two thousand two hundred and forty pounds (2,240 Lb).

The process, as described herein, includes wherein the anionic copolymer is derived from the copolymerization of an anionic monomer and a nonionic monomer, and a cross-linking monomer. Preferably, the process is as described herein, including wherein the anionic monomer is selected from the group consisting of acrylic acid, sodium acrylate, and potassium acrylate, and combinations thereof, and wherein the nonionic monomer is selected from the group consisting of acrylamide, and methacrylamide, and combinations thereof, and wherein the cross-linking monomer (or agent) is selected from the group consisting of N,N'-methylenebisacrylamide, N-(1-hydroxy-2,2-dimethyloxyethyl)acrylamide, a diamine, and a silicate, and combinations thereof.

In a preferred embodiment of the present invention, the process, as described herein, includes wherein the effective amount of the cross-linking monomer (or cross-linking agent) is from about one (1) parts-per-million to one-hundred (100) parts-per-million by dry weight basis based upon a combined dry weight of said anionic monomer and said nonionic monomer.

In a more preferred embodiment of the present invention, the process, as described herein, including wherein the anionic copolymer is derived from an anionic monomer that is acrylic acid and a nonionic monomer that is acrylamide.

In another embodiment of the present invention, a process for thickening an aqueous drilling mud waste materials is provided, comprising mixing an aqueous drilling mud waste materials having from greater than zero percent free liquid by weight to about ninety-nine percent by weight free liquid with an effective amount of at least one anionic homo-polymer and an effective amount of at least one nonionic homo-polymer and an effective amount of at least one cross-linking agent to form a cross-linked anionic copolymer in said aqueous drilling mud waste materials in-situ for treating the drilling mud waste materials, and providing an effective amount of time period sufficient for the treated drilling mud waste materials to thicken for eliminating the free liquid in the untreated drilling mud waste materials, and optionally transporting the thickened treated drilling mud waste materials to a landfill for disposal. In this process, one embodiment including simultaneously mixing the anionic homo-polymer and the nonionic homo-polymer and the cross-linking agent (or cross-linking monomer) into the aqueous drilling mud waste materials, is provided. In yet another embodiment of this process, the process including sequentially mixing the anionic homo-polymer, the nonionic homo-polymer, and the cross-linking agent into the untreated aqueous drilling mud waste materials to form a treated drilling mud waste materials is provided. In another embodiment of this process, the process including sequentially mixing the nonionic homo-polymer, the anionic homo-polymer, and the cross-linking agent into the aqueous drilling mud waste materials to form a treated drilling mud waste materials is provided.

A modified drilling mud waste material is provided comprising an aqueous drilling mud waste material having zero percent by weight free liquid and one or more anionic copolymers. The modified drilling mud waste material includes wherein the anionic copolymer is derived from the copolymerization of an anionic monomer, a nonionic monomer, and a cross-linking monomer.

In another embodiment, the modified drilling mud waste material comprises wherein the anionic monomer is selected from the group consisting of acrylic acid, sodium acrylate, and potassium acrylate, and combinations thereof, wherein the nonionic monomer is selected from the group consisting of acrylamide, and methacrylamide, and combinations thereof, and wherein the cross-linking monomer is selected from the group consisting of N,N'-methylenebisacrylamide, N-(1-hydroxy-2,2-dimethyloxyethyl)acrylamide, a diamine, and a silicate, and combinations thereof.

The average molecular weight ranges of the anionic copolymers range from about one (1) million to about thirty (30) million, inclusive. The ratio of the anionic monomer to the nonionic monomer is from about 1:99 to about 99:1, inclusive. Preferably, the weight ratio of the anionic monomer to the nonionic monomer is from about 10:90 to about 90:10, inclusive, and more preferably from 20:80 to about 50:50, inclusive. It will be appreciated by those persons skilled in the art that the ratio of anionic monomer to nonionic monomer units in the anionic copolymer generally is determined by the quantity of anionic units necessary in the instant composition to impart the desired liquid absorbing effects of the treated drilling mud waste materials for achieving compliance with the Paint Filter Liquids Test Method 9095B, and thus meeting current landfill waste acceptance criteria.

An effective amount of the anionic copolymer should be employed in the process of this invention. It will be appreciated by those persons skilled in the art that the dosage of the anionic copolymer added to the untreated aqueous drilling mud waste materials being treated is dependent upon the degree of free water that is associated with the aqueous drilling mud waste materials. The free water content of the pretreated aqueous drilling mud waste materials may range from greater than zero to about ninety-nine weight percent (99.0 wgt. %) liquid content, the remainder being solids content. Generally, the free water content of the pretreated aqueous drilling mud waste materials will be greater than eighty weight percent free water with the remainder (20 wgt. %) being solids content. Preferably, in the process of the instant invention, an effective amount is, for example but not limited to, at least about four (4) pounds to about seventy (70) pounds, inclusive, of the anionic copolymer mixed mechanically per one long wet ton of pretreated aqueous drilling mud waste materials. The untreated aqueous drilling mud waste materials may be fresh from the drilling rig operation or may have been previously subjected to centrifugation, or shaker equipment to remove excess free water (i.e pre-treated with mechanical forces, for example) before starting the process of the present invention as described herein. The mechanical mixing of the homo-polymers and copolymers of the process of the present invention include any known conventional means of mixing known in the art, and include but is not limited to, for example, hand feeding the homo-polymers or copolymers by pails and mixing with rakes, or adding the homo-polymers or copolymers by use of large heavy equipment such as by screw-fed feeder or conveyor belt apparatus or by backhoe scoop, and mixing with any known in the art mixing devices such as for example but not limited to backhoe scoop stirring or mechanical auger stifling. As used herein, the term "long wet ton" (1 T) refers to two thousand two hundred and forty pounds (2,240 lbs.).

As used herein, a "high molecular weight" copolymer refers to a weight average molecular weight above about 100,000, inclusive, and preferably above 1,000,000. More preferably, the high molecular weight copolymer of the instant invention has a weight average molecular weight above about 2,000,000, and most preferably a weight average molecular weight ranging from about 2,000,000 to 20,000,000, or greater.

The anionic copolymers of the instant invention may be prepared using any conventional polymerization technique that is known by those skilled in the art The anionic and nonionic homo-polymers of the instant invention may be added to the aqueous drilling mud waste materials by any technique known by those skilled in the art.

The anionic copolymer may be added at any convenient point to the aqueous drilling mud waste materials. It will be appreciated by those skilled in the art that the exact points (locations) of addition of the anionic copolymer of the present process will be oil and gas industry site specific. Further, there is no required order of addition for adding the anionic homo-polymer and nonionic homo-polymer and cross-linking monomer to the untreated aqueous drilling mud waste materials. The nonionic homo-polymer may be added to the drilling mud waste materials first and then followed by the addition of the anionic homo-polymer to the nonionic homo-polymer treated drilling mud waste materials, and followed by the cross-linking monomer (cross-linking agent), or vice-versa. In another embodiment of this invention, the process includes wherein the nonionic homo-polymer and the anionic homo-polymer may be simultaneously added to the aqueous drilling mud waste materials along with a cross-linking monomer, either at the same or different points of addition. Further, another embodiment of this invention provides a process including wherein the nonionic monomer and the anionic monomer and a cross-linking monomer may be pre-mixed together to form the anionic copolymer and then this anionic copolymer is added to the aqueous drilling mud waste materials at any convenient point (location) of addition. Any suitable method of addition known in the art may be utilized. A preferred method of addition includes adequate dilution to accomplish dispersion of the anionic copolymer throughout the aqueous drilling mud waste materials.

The process of this invention includes employing specific chemical compositions as additions to aqueous drilling mud waste materials. These compositions include, for example but are not limited to, sodium or potassium salts of a cross-linked or structured polymer formed by the polymerization of an anionic monomer, optionally a nonionic monomer, and a cross-linking agent or monomer; sodium or potassium salts of copolymers of acrylic acid and nonionic monomers, such as acrylamide, and at least one cross-linking agent; and sodium or potassium salts of a hydrolyzed acrylamide polymer cross-linked with a cross-linking agent or monomer. Preferred compositions and properties include cross-linked copolymers of acrylamide and potassium acrylate, 1-99 mol % potassium acrylate, and more preferred 20-70 mol % potassium acrylate, with a bulk density of 1.10 g/cm$^3$, and a particle size ranging from 0.1-5 mm (millimeter) with a particle size of 0.1-0.5 mm (millimeter) more preferred. Cross-linking agents (or monomers) may include for example but are not limited to N,N'-methylenebisacrylamide, N-(1-hydroxy-2,2-dimethoxyethyl)acrylamide, diamines, and silicates, such as for example but not limited to a sodium silicate.

Another embodiment of the present invention provides a process for thickening an oil-based drilling mud waste materials comprising mixing an oil-based drilling mud waste materials having from greater than zero percent by weight free liquid to ninety nine percent by weight free liquid with an effective amount of at least one anionic copolymer to form a treated oil-based drilling mud waste materials, wherein said anionic copolymer is derived from either (a) a copolymerization of an anionic monomer and a nonionic monomer, and a cross-linking monomer; or (b) a non-cross-linked, linear chain co-polymer of an anionic polymer and a nonionic polymer; or (c) a blend of the combination of (a) and (b); and. providing an effective amount of time period sufficient for the treated oil-based drilling mud waste materials to thicken for eliminating the free liquid, and optionally transporting the thickened treated oil-based drilling mud waste materials to a landfill for disposal. In a preferred embodiment of this invention, the process, as described herein, includes wherein the anionic co-polymer of the non-cross-linked, linear chain co-polymer is 50% by weight of acrylic acid (anionic polymer) and 50% by weight of acrylamide (nonionic polymer).

A modified drilling mud waste material is provided comprising a drilling mud waste material having zero percent free liquid and one or more anionic copolymers. Preferably, the anionic copolymer of the modified drilling mud waste material is either (a) a cross-linked anionic co-polymer derived from a copolymerization of an anionic monomer and a non-ionic monomer, and a cross-linking monomer, or (b) a non-cross-linked, linear chain co-polymer of an anionic polymer and a nonionic polymer, or (c) a blend of the combination of (a) and (b). The drilling mud waste material may be a water-based drilling mud waste material, or a oil-based drilling mud waste material, or combinations thereof.

Another embodiment of the present invention provides a process for thickening a drilling mud waste materials comprising mixing a drilling mud waste materials having from greater than zero percent by weight free liquid to ninety nine percent by weight free liquid with an effective amount of at least one anionic copolymer to form a treated drilling mud waste materials, wherein the anionic copolymer is derived from either (a) a copolymerization of an anionic monomer and a nonionic monomer, and a cross-linking monomer, resulting in a cross-linked anionic copolymer; or (b) a non-cross-linked, linear chain co-polymer of an anionic polymer and a nonionic polymer; or (c) a blend of the combination of (a) and (b); and. providing an effective amount of time period sufficient for the treated drilling mud waste materials to thicken for eliminating the free liquid, and optionally transporting the thickened treated drilling mud waste materials to a landfill for disposal. The drilling mud waste materials may be oil-based drilling mud waste materials or a water-based drilling mud waste materials. In a preferred embodiment of this invention, the process, as described herein, includes wherein the anionic co-polymer of the non-cross-linked, linear chain co-polymer is 50% by weight of acrylic acid (anionic polymer) and 50% by weight of acrylamide (nonionic polymer).

Another embodiment of the present invention provides a process for thickening an aqueous drilling mud waste materials comprising mixing an aqueous drilling mud waste materials having from greater than zero percent by weight free liquid to ninety nine percent by weight free liquid with an effective amount of (i) at least one cross-linked anionic copolymer, as described herein, and (ii) a linear anionic copolymer, as described herein, to form a treated drilling mud waste materials; and providing an effective amount of time period sufficient for the treated drilling mud waste materials to thicken for eliminating the free liquid, and optionally transporting the thickened treated drilling mud waste materials to a landfill for disposal. Preferably, this process includes wherein the cross-linked anionic copolymer and the linear anionic copolymer are added to the aqueous drilling mud waste as a blend. More preferably, this process includes wherein the cross-linked anionic copolymer and the linear anionic copolymer are added to the aqueous drilling mud sequentially in any order of addition or simultaneously.

A further embodiment of this invention provides a process for thickening an aqueous drilling mud waste materials comprising mixing an aqueous drilling mud waste materials having from greater than zero percent by weight free liquid to ninety nine percent by weight free liquid with an effective amount of (i) at least one nonionic homo-polymer, as described herein, (ii) at least one linear anionic copolymer, as described herein, and (iii) a cross-linking monomer, as described herein, to form a treated drilling mud waste materials; and providing an effective amount of time period sufficient for the treated drilling mud waste materials to thicken for eliminating the free liquid, and optionally transporting the thickened treated drilling mud waste materials to a landfill for disposal. Preferably, this process includes wherein the non-ionic homo-polymer, the linear anionic copolymer, and the cross-linking monomer are added to the aqueous drilling mud waste as a blend. More preferably, this process includes wherein the nonionic homo-polymer, the linear anionic copolymer, and the cross-linking monomer are added to the aqueous drilling mud sequentially in any order of addition or simultaneously.

Another embodiment of the present invention provides a process for thickening an aqueous drilling mud waste materials comprising mixing an aqueous drilling mud waste materials having from greater than zero percent by weight free liquid to ninety nine percent by weight free liquid with an effective amount of (i) at least one cross-linked anionic copolymer, as described herein, and (ii) a cross-linking monomer, as described herein, to form a treated drilling mud waste materials; and providing an effective amount of time period sufficient for the treated drilling mud waste materials to thicken for eliminating the free liquid, and optionally transporting the thickened treated drilling mud waste materials to a landfill for disposal. Preferably, this process includes wherein the cross-linked anionic copolymer and the cross-linking monomer are added to the aqueous drilling mud waste as a blend. More preferably, this process includes wherein the cross-linked anionic copolymer and the cross-linking monomer are added to the aqueous drilling mud sequentially in any order of addition or simultaneously.

EXAMPLES

The following examples demonstrate the invention in greater detail. These examples are not intended to limit the scope of the invention in any way. In the present invention, the use of anionic copolymers optimally thicken an aqueous drilling mud waste material. The aqueous drilling mud waste materials include for example but are not limited to drilling muds used in the operation of a drilling and well rigs, fluids and solvents associated therewith, sand, clays, and drill cuttings from the drilling operations. Before treatment with the process of the present invention, the aqueous drilling waste materials have greater than zero percent by weight free water, and in general the aqueous drilling mud waste materials may contain up to about ninety-nine weight percent (99.0 wgt. %) free water with the reminder being about ninety-nine weight percent (99.0 wgt %) to one percent (1.0%) by weight solids from the drilling well operations, respectively.

Typically, the oil or gas well drilling operator manager of the drilling operations may optionally first subject the aqueous drilling mud waste materials that initially present themselves from the drilling operations and which are earmarked for disposal into the mud pit to a mechanical pressing, shaker, or centrifuging operation, with or without the addition of a surfactant, in order to try to reduce the moisture content of the aqueous drilling mud waste materials from about 99.0 weight percent water to about 80.0 weight percent water (the remaining amount is solid waste material), and preferably to reduce the moisture content of the drilling mud waste materials to less than 50.0 weight percent free water. In the examples set forth below, the drilling mud waste materials being treated with the process of the present invention had varying amounts of free water associated with the drilling mud waste materials upon visual inspection and thus each drilling mud waste material example would have failed the paint filter liquids test (Paint Filter Liquids Test Method 9095B set forth below) employed by landfills to determine the presence or absent of any free water in a material presented for disposal in the landfill. As stated hereinbefore, if free water is present in the subject waste, the subject waste is rejected by the landfill and will not be accepted for disposal into the landfill. The following examples show that the process of the present invention wherein the anionic copolymer of the present process absorbs 150 to 500 times its weight in water, wherein there is minimal change in volume of the treated solids, wherein the anionic copolymer is added to the waste materials with ease, wherein the reaction of the anionic copolymer with the waste materials is quick with solidification (thickening) of the treated waste materials occurring within several minutes to less than about twenty four hours, and wherein the expense of the process of the present invention is economical (about one-fifth the cost of using conventional thickening compounds such as sawdust to thicken and transport the same volume of treated drilling mud waste to a landfill). These and other advantages will be evident from the following examples.

The anionic copolymer employed in the following Examples 1-3 was derived from a cross-linked anionic monomer that is acrylic acid and a nonionic monomer that is acrylamide, and a crosslinking monomer which is N,N'-methylenebisacrylamide, wherein the ratio of the anionic monomer to nonionic monomer is 30:70. Examples 1-3 employ aqueous-based drilling mud waste. The ratio of the anionic monomer to the nonionic monomer in the anionic copolymer ranges from 1:99 to 99:1, preferably from 10:90 to 90:10, and more preferably from 20:80 to 50:50. An effective amount of a cross-linking agent or cross-linking monomer is from about 1 parts-per-million to 100 parts-per-million by dry weight basis based upon a combined weight of the anionic monomer and the nonionic monomer.

Examples 4-7 employ oil-based drilling mud waste materials. The anionic polymers are described in each of the Examples 4-7, respectively. The dosage of the anionic copolymer added to the oil-based drilling mud waste materials in each Example 4-7, respectively, is 0.75% by weight based upon the drilling mud waste (wet), or about 15 pounds of anionic copolymer per ton of oil-based drilling mud waste.

Example 1

About 12.61 tons of red clay-aqueous based drilling mud waste materials solids with more than one inch of free water associated therewith is provided for treatment with the process of the present invention. About 330 pounds of dry anionic copolymer was mixed thoroughly into this drilling mud waste materials with the scoop of a backhoe. The dosage of the anionic copolymer to the drilling mud waste materials was 26.2 pounds per ton of drilling mud waste materials. After thorough mixing for 60 minutes, a portion of the treated drilling mud waste materials was subjected to the Paint Filter Liquids Test Method 9095B (set forth for convenience below in outline form, sections 1-10, revision 2, November 2004). The treated drilling mud waste materials passed the Paint Filter Liquids Test Method 9095B as there was no free water associated with the treated drilling mud waste material. The treated drilling mud waste material was accepted by the landfill for disposal.

Paint Filter Liquids Test Method 9095B 1.0 Scope and Application
 1.1 This method is used to determine the presence of free liquids in a representative sample of waste.
 1.2 The method is used to determine compliance with 40 CFR 264.314 and 265.314.
2.0 Summary of Method
 2.1 A predetermined amount of material is placed in a paint filter. If any portion of the material passes through and drops from the filter within the 5-min test period, the material is deemed to contain free liquids.
3.0 Interferences
 3.1 Filter media were observed to separate from the filter cone on exposure to alkaline materials. This development causes no problem if the sample is not disturbed.
 3.2 Temperature can affect the test results if the test is performed below the freezing point of any liquid in the sample. Tests must be performed above the freezing point and can, but are not required to, exceed room temperature of 25° C.
4.0 Apparatus and Materials
 4.1 Conical paint filter—Mesh number 60+/−5% (fine meshed size). Available at local paint stores such as Sherwin-Williams and Glidden.
 4.2 Glass funnel—If the paint filter, with the waste, cannot sustain its weight on the ring stand, then a fluted glass funnel or glass funnel with a mouth large enough to allow at least 1 in. of the filter mesh to protrude should be used to support the filter. The funnel should be fluted or have a large open mouth in order to support the paint filter yet not interfere with the movement, to the graduated cylinder, of the liquid that passes through the filter mesh.
 4.3 Ring stand and ring, or tripod.
 4.4 Graduated cylinder or beaker—100-mL.
5.0 Reagents
 5.1 None.
6.0 Sample Collection, Preservation, and Handling
 A 100-mL or 100-g representative sample is required for the test. If it is not possible to obtain a sample of 100 mL or 100 g that is sufficiently representative of the waste, the analyst may use larger size samples in multiples of 100 mL or 100 g, i.e., 200, 300, 400 mL or g. However, when larger samples are used, analysts shall divide the sample into 100-mL or 100-g portions and test each portion separately. If any portion contains free liquids, the entire sample is considered to have free liquids. If the sample is measured volumetrically, then it should lack major air spaces or voids.
7.0 Procedure
 7.1 Assemble test apparatus as shown in FIG. 1.
 7.2 Place sample in the filter. A funnel may be used to provide support for the paint filter. If the sample is of such light bulk density that it overflows the filter, then the sides of the filter can be extended upward by taping filter paper to the inside of the filter and above the mesh. Settling the sample into the paint filter may be facilitated by lightly tapping the side of the filter as it is being filled.

7.3 In order to assure uniformity and standardization of the test, material such as sorbent pads or pillows which do not conform to the shape of the paint filter should be cut into small pieces and poured into the filter. Sample size reduction may be accomplished by cutting the sorbent material with scissors, shears, a knife, or other such device so as to preserve as much of the original integrity of the sorbent fabric as possible. Sorbents enclosed in a fabric should be mixed with the resultant fabric pieces. The particles to be tested should be reduced smaller than 1 cm (i.e., should be capable of passing through a 9.5 mm (0.375 inch) standard sieve). Grinding sorbent materials should be avoided as this may destroy the integrity of the sorbent and produce many "fine particles" which would normally not be present.

7.4 For brittle materials larger than 1 cm that do not conform to the filter, light crushing to reduce oversize particles is acceptable if it is not practical to cut the material. Materials such as clay, silica gel, and some polymers may fall into this category.

7.5 Allow sample to drain for 5 min into the graduated cylinder.

7.6 If any portion of the test material collects in the graduated cylinder in the 5-min period, then the material is deemed to contain free liquids for purposes of 40 CFR 264.314 and 265.314.

8.0 Quality Control 8.1 Duplicate samples should be analyzed on a routine basis.

In the above Paint Filter Liquids Test Method 9095B, "CFR" refers to the United States of America, Federal Code of Regulations. The abbreviations "mL" refers to milliliter, "g" refers to gram, "mm" refers to millimeter, and "min" refers to minute.

FIG. 2 shows the Paint Filter Liquids Test Method 9095B decision tree used by landfill operators to determine if a representative sample of waste is deemed to be free of any free liquids. Only those sample wastes that are deemed to be devoid of free liquids may be disposed in a landfill.

Example 2

An aqueous drilling mud waste materials was subjected to treatment by centrifuge to reduce the moisture content from greater than 90.0 weight percent to lower than 10 weight percent free water. The cake of drilling mud waste materials produced as a result of the standard centrifugation process know by those skilled in the art was 26.67 tons of processed solids with little free water evident by visual inspection which revealed free water only on the bottom edges of the solids pile in the container. This is a "'typical centrifuged" drilling mud waste material cake. To this centrifuged drilling mud waste material cake, 220 pounds of dry anionic copolymer was added and thoroughly mixed into the centrifuged drilling mud waste material cake by use of a backhoe scoop for about 60 minutes. The dosing of the anionic copolymer was 8.3 pounds per ton of centrifuged drilling mud waste materials cake. After thorough mixing for 60 minutes, a portion of the treated centrifuged drilling mud waste material cake was subjected to the Paint Filter Liquids Test Method 9095B. The treated centrifuged drilling mud waste material cake passed the Paint Filter Liquids Test Method 9095B. There was no free water associated with the treated drilling mud waste material and thus the treated drilling mud waste material was accepted by the landfill for disposal.

The results of the above examples show that the process of the present invention that employs an anionic copolymer effectively eliminates the free water associated with drilling mud waste materials to produce a modified drilling mud waste material that may be successfully disposed of in a landfill.

Examples 3A and 3B

Applicants supply the following examples of the process of this invention to demonstrate several embodiments of the present invention. Example 3A shows the addition of various dosages in pounds (Lb) of the following compositions of the present invention: (a) cross-linked anionic copolymer of an anionic monomer that is acrylic acid and a nonionic monomer of acrylamide having an acrylic acid monomer/acrylamide monomer ratio of 80:20 (Composition 3A-1); (b) a 50/50 weight percent blend of a (i) cross-linked anionic copolymer of Composition 3A-1 and (ii) a linear anionic copolymer of an anionic monomer that is acrylic acid and a nonionic monomer that is acrylamide having an acrylic acid monomer/acrylamide monomer ratio of 50:50 (Composition 3A-2); (c) a 33/33/33 weight percent blend of (i) a nonionic homo-polymer of acrylamide, (ii) a linear anionic copolymer of an anionic monomer that is an acrylic acid monomer and a nonionic monomer that is an acrylamide monomer having an acrylic acid monomer/acrylamide monomer ratio of 30:70, and (iii) a sodium silicate (cross-linking agent) (Composition 3A-3); and (d) a 25/25/50 weight percent blend of (i) a nonionic homo-polymer of acrylamide, (ii) a linear anionic copolymer of an anionic monomer that is an acrylic acid monomer and a nonionic monomer that is an acrylamide monomer having an acrylic acid monomer/acrylamide monomer ratio of 30:70, and (iii) a sodium silicate (cross-linking agent)(Composition 3A-4), to a ton (T) of an untreated aqueous drilling mud waste material having approximately a twenty-eight weight percent moisture content. Example 3A shows the results of each addition by dosage for Compositions 3A-1, 3A-2, 3A-3, and 3A-4. Example 3A shows that the method of the present invention of adding to the untreated aqueous drilling mud waste material an effective amount of a blend of a nonionic homo-polymer, linear anionic copolymer, and a cross-linking agent (or cross-linking monomer), hereinafter referred to as "the additions", as a blend (Compositions 3A-3 and 3A-4) produces superior results of eliminating any free water in the aqueous drilling mud waste materials at a 5 pound dosage per ton of drilling mud waste material when comparison to the addition of the same five pound dosage/ton of drilling mud waste material of the cross-linked anionic copolymer of the present invention (Composition 3A-1) alone to said untreated drilling mud waste material. Example 3B shows the addition of various dosages in pounds (Lb) of the following compositions of the present invention: (a) a sequential addition (the additions may be in any order of addition) of (i) a sodium silicate (cross-linking agent) and (ii) a cross-linked anionic copolymer of an anionic monomer that is acrylic acid and a nonionic monomer that is acrylamide said copolymer having an acrylic acid monomer/acrylamide monomer ratio of 20:80 (Composition 3B-3); and (b) sequential addition (the additions may be made in any order of addition) of (i) a sodium silicate (cross-linking agent) and (ii) a cross-linked anionic copolymer of an anionic monomer that is acrylic acid and a nonionic monomer that is acrylamide said cross-linked anionic copolymer having an acrylic acid monomer/acrylamide monomer ratio of 30:70 (Composition 3B-4), to a ton of an untreated aqueous drilling mud waste material having approximately a twenty-eight weight percent moisture content. Example 3B shows the use of the cross-linked anionic copolymer of an anionic monomer that is acrylic acid and a nonionic monomer that is acrylamide, the cross-linked anionic copolymer having an acrylic acid monomer/acrylamide monomer ratio of 20:80 (Composition 3B-1) added to said untreated aqueous drilling mud waste material having approximately a twenty-eight weight percent moisture content. Example 3B also shows for comparison purposes the use of a sodium silicate (cross-linking agent) addition to said untreated aqueous drilling mud waste having approximately twenty eight weight percent moisture content (comparison Composition 3B-2). Example 3B shows the results of each addition by dosage for Compositions 3B1, 3B-2, 3B-3, and 3B-4. Example 3B shows that the method of the present invention of adding an effective amount of a cross-linked anionic copolymer with a cross-linking agent, such as for example but not limited to a sodium silicate, hereinafter referred to as "the additions", as a sequential addition (said additions may be performed in any order of addition desired) eliminates any free water in the aqueous drilling mud waste materials in comparison to the addition of the cross-linking agent alone to the untreated drilling mud waste material. The Paint Filter Liquids Test Method 9095B confirmed the visible appearance results set forth in Tables 1 and 2 for compositions 3A-1, 3A-2, 3A-3, 3A-4, 3B-3, 3B-4, and for the 10 and 20 pound dosages/ton concerning composition 3B-1 wherein it was determined that the presence of any free water remaining in the treated drilling mud waste material was absent. Thus, the Paint Filter Liquids Test confirmed that the process of the present invention achieved one hundred percent elimination of any free water associated with the drilling mud waste materials.

Example 3A

An untreated aqueous drilling mud waste material, containing approximately 28% moisture, was treated with an effective amount of the compositions set forth in Table 1, including a blend of a linear nonionic homo-polymer, a linear anionic copolymer, and sodium silicate for a sufficient amount of time see Table 1) to form in situ a cross-linked copolymer derived from the additions. The treated drilling mud waste material did not contain any free water.

TABLE 1

| | Composition | Lb/T added | Time to solidify (min) |
|---|---|---|---|
| 1. | Cross-linked anionic copolymer | 5 | 27 |
| | | 10 | 5 |
| | | 15 | 1 |
| 2. | 50/50 wt % blend of cross-linked anionic copolymer/linear anionic copolymer | 5 | 4 |
| | | 10 | 2 |
| | | 15 | 1 |
| 3. | 33/33/33 wt % blend of nonionic homo-polymer/linear anionic copolymer/sodium silicate | 5 | 7 |
| | | 10 | 2.5 |
| | | 15 | 1.5 |
| 4. | 25/25/50 wt % blend of nonionic homo-polymer/linear anionic copolymer/sodium silicate | 5 | 6 |
| | | 10 | 2.5 |
| | | 15 | 1.5 |

Example 3B

An aqueous drilling mud material was treated with an effective amount of cross-linked, anionic polymer, and sodium silicate, as indicated in Table 2, for a sufficient amount of time (as indicated in Table 2) to increase in situ the degree of crosslinking of the anionic polymer added to the aqueous drilling mud. The treated drilling mud waste material did not contain any free water.

TABLE 2

| | Composition | Lb/T added | Appearance after mixing |
|---|---|---|---|
| 1. | Cross-linked anionic copolymer | 5 | Wet, sticky |
| | | 10 | No water visible |
| | | 20 | Dry, soil texture |
| 2. | Sodium silicate | 5 | Wet |
| 3. | Sodium silicate/cross-linked anionic copolymer, added sequentially | 5/5 | No water visible |
| 4. | Sodium silicate/cross-linked anionic copolymer, added sequentially | 5/5 | No water visible |

Example 4

Fifteen pounds of 100% by weight of an anionic co-polymer of a non-cross-linked, linear chain co-polymer of 50% by weight of acrylic acid (anionic polymer) and 50% by weight of acrylamide (nonionic polymer) per ton of oil-based drilling mud waste was mixed thoroughly together with the scoop of a backhoe. After thorough mixing for 5 minutes, a portion of the treated oil-based drilling mud waste materials was subjected to the Paint Filter Liquids Test Method 9095B (set forth for convenience below in outline form, sections 1-10, revision 2, November 2004). The treated drilling mud waste materials passed the Paint Filter Liquids Test Method 9095B as there was no free water associated with the treated drilling mud waste material.

Example 5

Fifteen pounds of an anionic co-polymer comprising a blend of (a) 75% by weight of an anionic co-polymer of a non-cross-linked, linear chain co-polymer of 50% by weight of acrylic acid (anionic polymer) and 50% by weight of acrylamide (nonionic polymer), and (b) 25% by weight of a cross-linked anionic co-polymer of acrylic acid and a nonionic monomer that is acrylamide, and a cross-linking monomer which is N,N'-methylenebisacrylamide, wherein concerning the cross-linked anionic co-polymer the ratio of the anionic monomer to nonionic monomer is 30:70, per ton of oil-based drilling mud waste was mixed thoroughly together with the scoop of a backhoe. After thorough mixing for 5 minutes, a portion of the treated oil-based drilling mud waste materials was subjected to the Paint Filter Liquids Test Method 9095B (set forth for convenience below in outline form, sections 1-10, revision 2, November 2004). The treated drilling mud waste materials passed the Paint Filter Liquids Test Method 9095B as there was no free water associated with the treated drilling mud waste material.

Example 6

Fifteen pounds of an anionic co-polymer comprising a blend of (a) 50% by weight of an anionic co-polymer of a non-cross-linked, linear chain co-polymer of 50% by weight of acrylic acid (anionic polymer) and 50% by weight of acrylamide (nonionic polymer), and (b) 50% by weight of a cross-linked anionic co-polymer of acrylic acid and a nonionic monomer that is acrylamide, and a cross-linking monomer which is N,N'-methylenebisacrylamide, wherein concerning the cross-linked anionic co-polymer the ratio of the anionic monomer to nonionic monomer is 30:70, per ton of oil-based drilling mud waste was mixed thoroughly together with the scoop of a backhoe. After thorough mixing for 5 minutes, a portion of the treated oil-based drilling mud waste materials was subjected to the Paint Filter Liquids Test Method 9095B (set forth for convenience below in outline form, sections 1-10, revision 2, November 2004). The treated drilling mud waste materials passed the Paint Filter Liquids Test Method 9095B as there was no free water associated with the treated drilling mud waste material.

Example 7

Fifteen pounds of an anionic co-polymer comprising (a) 25% by weight of an anionic co-polymer of a non-cross-linked, linear chain co-polymer of 50% by weight of acrylic acid (anionic polymer) and 50% by weight of acrylamide (nonionic polymer), and (b) 75% by weight of a cross-linked anionic co-polymer of acrylic acid and a nonionic monomer that is acrylamide, and a cross-linking monomer which is N,N'-methylenebisacrylamide, wherein concerning the cross-linked anionic co-polymer the ratio of the anionic monomer to nonionic monomer is 30:70, per ton of oil-based drilling mud waste was mixed thoroughly together with the scoop of a backhoe. After thorough mixing for 5 minutes, a portion of the treated oil-based drilling mud waste materials was subjected to the Paint Filter Liquids Test Method 9095B (set forth for convenience below in outline form, sections 1-10, revision 2, November 2004). The treated drilling mud waste materials passed the Paint Filter Liquids Test Method 9095B as there was no free water associated with the treated drilling mud waste material.

Example 6 provided the best results regarding oil-based drilling mud waste materials tested. The anionic copolymer of Example 6 absorbed the free water associated with the oil-based drilling mud waste and was the easiest to mix. The anionic copolymer of Example 5 provided the next best results as it absorbed all of the free water associated with the oil-based drilling mud waste and was fairly easy to mix. The anionic copolymer of Example 4 absorbed all of the free water associated with the oil-based drilling mud waste but the anionic copolymer was very stringy and sticky and messy to mix, and is less preferable than the copolymers set forth in Examples 5-7.

A 100 weight percent by weight of a cross-linked anionic polymer added to an oil-based drilling mud waste material will also absorb free liquids associated with such oil-based drilling mud waste material, wherein the cross-linked anionic copolymer is derived from acrylic acid and a nonionic monomer that is acrylamide, and a cross-linking monomer which is N,N'-methylenebisacrylamide, wherein the ratio of the anionic monomer to the nonionic monomer is 30:70, however a dosage greater than 15 pounds of the cross-linked anionic copolymer per ton of oil-based drilling mud waste is required to absorb all of the free liquid associated with the oil-based drilling mud waste material, and thus such addition is not preferable economically when compared to the anionic copolymers of Examples 4-7.

Whereas particular embodiments of the instant invention have been described for purposes of illustration, it will be evident to those persons skilled in the art that numerous variations and details of the instant invention may be made without departing from the instant invention as defined in the appended claims.

We claim:

1. A process for thickening an aqueous drilling mud waste materials comprising:
   mixing an aqueous drilling mud waste materials having from greater than zero percent by weight free liquid to ninety nine percent by weight free liquid with an effective amount of at least one anionic copolymer to form a treated drilling mud waste materials, wherein said anionic copolymer is derived from the copolymerization of an anionic monomer and a nonionic monomer, and a cross-linking monomer that is selected from the group consisting of N,N'-methylenebisacrylamide, N-(1-hydroxy-2,2-dimethyloxyethyl)acrylamide, a diamine, and a silicate, and combinations thereof; and
   providing an effective amount of time period sufficient for said treated drilling mud waste materials to thicken for eliminating said free liquid, and subjecting said treated drilling mud waste materials to a Paint Filter Liquids Test Method 9095B protocol to confirm achieving one hundred percent elimination of free liquid, and optionally transporting said thickened treated drilling mud waste materials to a landfill for disposal.

2. The process of claim 1 including wherein said effective amount of said anionic copolymer is from about four pounds to about seventy pounds by dry weight per one long ton of said aqueous drilling mud waste materials.

3. The process of claim 1 including wherein the ratio of said anionic monomer to said nonionic monomer of said anionic copolymer is from 1:99 to 99:1.

4. The process of claim 3 including wherein said anionic monomer is selected from the group consisting of acrylic acid, sodium acrylate, and potassium acrylate, and combinations thereof, and wherein said nonionic monomer is selected from the group consisting of acrylamide and methacrylamide, and combinations thereof.

5. The process of Claim 1 including wherein said effective amount of said cross-linking monomer is from about 1 parts-per-million to 100 parts-per-million by dry weight basis based upon a combined weight of said anionic monomer and said nonionic monomer.

6. The process of claim 1 including wherein said anionic copolymer is derived from an anionic monomer that is acrylic acid and a nonionic monomer that is acrylamide.

7. A process for thickening an aqueous drilling mud waste materials comprising:
   mixing an aqueous drilling mud waste materials having from greater than zero percent by weight free liquid to ninety nine percent by weight free liquid with an effective amount of at least one anionic homo-polymer and an effective amount of at least one nonionic homo-polymer and an effective amount of at least one cross-linking agent that is selected from the group consisting of N,N'-methylenebisacrylamide, N-(1-hydroxy-2,2-dimethyloxyethyl)acrylamide, a diamine, and a silicate, and combinations thereof, to form a cross-linked anionic copolymer in said aqueous drilling mud waste materials in-situ for treating said drilling mud waste materials; and
   providing an effective amount of time period sufficient for said treated drilling mud waste materials to thicken for eliminating said free liquid, and subjecting said treated drilling mud waste materials to a Paint Filter Liquids Test Method 9095B protocol to confirm achieving one hundred percent elimination of free liquid, and optionally transporting said thickened treated drilling mud waste materials to a landfill for disposal.

8. The process of claim 7 including simultaneously mixing said anionic homo-polymer and said nonionic homo-polymer and said cross-linking agent into said aqueous drilling mud waste materials.

9. The process of claim 7 including sequentially mixing said anionic homo-polymer, said nonionic homo-polymer, and said cross-linking agent into said aqueous drilling mud waste materials.

10. The process of claim 7 including sequentially mixing said nonionic homo-polymer, said anionic homo-polymer, and said cross-linking agent into said aqueous drilling mud waste materials.

11. A modified drilling mud waste materials comprising:
an aqueous drilling mud waste materials having zero percent free liquid;
and one or more anionic copolymers wherein said anionic copolymer is derived from the copolymerization of an anionic monomer and a nonionic monomer, and a cross-linking monomer that is selected from the group consisting of N,N'-methylenebisacrylamide, N-(1-hydroxy-2,2-dimethyloxyethyl)acrylamide, a diamine, and a silicate, and combinations thereof.

12. The modified drilling mud waste materials of claim 11 wherein the ratio of said anionic monomer to said nonionic monomer of said anionic copolymer is from 1:99 to 99:1.

13. The modified drilling mud waste materials of claim 12 wherein said anionic monomer is selected from the group consisting of acrylic acid, sodium acrylate, and potassium acrylate, and combinations thereof, and wherein said nonionic monomer is selected from the group consisting of acrylamide, and methacrylamide, and combinations thereof.

14. A process for thickening an oil-based drilling mud waste materials comprising:
mixing an oil-based drilling mud waste materials having from greater than zero percent by weight free liquid to ninety nine percent by weight free liquid with an effective amount of at least one anionic copolymer to form a treated oil-based drilling mud waste materials, wherein said anionic copolymer is derived from either (a) a copolymerization of an anionic monomer and a nonionic monomer, and a cross-linking monomer that is selected from the group consisting of N,N'-methylenebisacrylamide, N-(1-hydroxy-2,2-dimethyloxyethyl)acrylamide, a diamine, and a silicate, and combinations thereof; or (b) a non-cross-linked, linear chain co-polymer of an anionic polymer and a nonionic polymer; or (c) a blend of the combination of (a) and (b); and,
providing an effective amount of time period sufficient for said treated oil-based drilling mud waste materials to thicken for eliminating said free liquid, and subjecting said treated drilling mud waste materials to a Paint Filter Liquids Test Method 9095B protocol to confirm achieving one hundred percent elimination of free liquid, and optionally transporting said thickened treated oil-based drilling mud waste materials to a landfill for disposal.

15. The process of claim 14 including wherein said (b) anionic co-polymer of a non-cross-linked, linear chain co-polymer is 50% by weight of acrylic acid and 50% by weight of acrylamide.

16. A modified drilling mud waste material is provided comprising:
a drilling mud waste material having zero percent free liquid and one or more anionic copolymers, wherein said anionic copolymer is either (a) a non-cross-linked, linear chain co-polymer of an anionic polymer and a nonionic polymer, or (b) a blend of the combination of (a) and a cross-linked anionic co-polymer derived from a copolymerization of an anionic monomer and a nonionic monomer, and a cross-linking monomer that is selected from the group consisting of N,N'-methylenebisacrylamide, N-(1-hydroxy-2,2-dimethyloxyethyl)acrylamide, a diamine, and a silicate, and combinations thereof.

17. The modified drilling mud waste material of claim 16 wherein said drilling mud waste material is either a water-based drilling mud waste material, an oil-based drilling mud waste material, or combinations thereof.

18. A process for thickening a drilling mud waste materials comprising:
mixing a drilling mud waste materials having from greater than zero percent by weight free liquid to ninety nine percent by weight free liquid with an effective amount of at least one anionic copolymer to form a treated drilling mud waste materials, wherein said anionic copolymer is derived from either (a) a non-cross-linked, linear chain copolymer of an anionic polymer and a nonionic polymer; or (b) a blend of the combination of (a) and and a copolymerization of an anionic monomer and a nonionic monomer, and a cross-linking monomer that is selected from the group consisting of N,N'-methylenebisacrylamide, N-(1-hydroxy-2,2-dimethyloxyethyl)acrylamide, a diamine, and a silicate, and combinations thereof, resulting in a cross-linked anionic copolymer;
providing an effective amount of time period sufficient for the treated drilling mud waste materials to thicken for eliminating the free liquid, and subjecting said treated drilling mud waste materials to a Paint Filter Liquids Test Method 9095B protocol to confirm achieving one hundred percent elimination of free liquid, and optionally transporting the thickened treated drilling mud waste materials to a landfill for disposal.

19. The process of claim 18 including wherein said drilling mud waste materials is an oil-based drilling mud waste materials or a water-based drilling mud waste materials, or a combination thereof.

20. The process of claim 18 including wherein said anionic copolymer of said non-cross-linked, linear chain copolymer is 50% by weight of acrylic acid and 50% by weight of acrylamide.

21. A process for thickening an aqueous drilling mud waste materials comprising:
mixing an aqueous drilling mud waste materials having from greater than zero percent by weight free liquid to ninety nine percent by weight free liquid with an effective amount of (i) at least one cross-linked anionic copolymer wherein said cross-linked anionic copolymer was the result of using a cross-linking monomer that is selected from the group consisting of N,N'-methylenebisacrylamide, N-(1-hydroxy-2,2-dimethyloxyethyl)acrylamide, a diamine, and a silicate, and combinations thereof, and (ii) a linear anionic copolymer to form a treated drilling mud waste materials; and
providing an effective amount of time period sufficient for said treated drilling mud waste materials to thicken for eliminating said free liquid, and subjecting said treated drilling mud waste materials to a Paint Filter Liquids Test Method 9095B protocol to confirm achieving one hundred percent elimination of free liquid, and optionally transporting said thickened treated drilling mud waste materials to a landfill for disposal.

22. The process of claim 21 including wherein said cross-linked anionic copolymer and said linear anionic copolymer are added to said aqueous drilling mud waste as a blend.

23. The process of claim 21 including wherein said cross-linked anionic copolymer and said linear anionic copolymer are added to said aqueous drilling mud sequentially in any order of addition or simultaneously.

* * * * *